(12) United States Patent
Lee et al.

(10) Patent No.: US 8,008,382 B2
(45) Date of Patent: *Aug. 30, 2011

(54) FLAMEPROOF THERMOPLASTIC RESIN COMPOSITION

(75) Inventors: Jin Seong Lee, Uiwang-si (KR); Bok Nam Jang, Uiwang-si (KR); In Chul Jung, Uiwang-si (KR); Yun Ku Nam, Uiwang-si (KR); Mi Ran Cho, Uiwang-si (KR)

(73) Assignee: Cheil Industries Inc., Gumi-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 12/644,516

(22) Filed: Dec. 22, 2009

(65) Prior Publication Data

US 2010/0168296 A1 Jul. 1, 2010

(30) Foreign Application Priority Data

Dec. 29, 2008 (KR) .......................... 10-2008-0135170

(51) Int. Cl.
*C08K 5/521* (2006.01)
(52) U.S. Cl. .......................... 524/127; 524/140; 524/141
(58) Field of Classification Search .................. 524/117, 524/141, 140
See application file for complete search history.

(56) References Cited

U.S. PATENT DOCUMENTS

| | | | |
|---|---|---|---|
| 4,536,538 A * | 8/1985 | Liu ................................. | 524/508 |
| 4,618,633 A | 10/1986 | Taubitz et al. | |
| 5,061,745 A | 10/1991 | Wittmann et al. | |
| 5,122,556 A * | 6/1992 | Kambour ....................... | 524/141 |
| 5,204,394 A | 4/1993 | Gosens et al. | |
| 5,674,924 A | 10/1997 | Lee et al. | |
| 5,674,928 A | 10/1997 | Chisholm et al. | |
| 6,306,941 B1 | 10/2001 | Klatt et al. | |
| 6,716,900 B2 | 4/2004 | Jang et al. | |
| 7,786,196 B2 * | 8/2010 | Jung et al. ...................... | 524/117 |
| 2002/0016410 A1 | 2/2002 | Katayama et al. | |
| 2004/0058174 A1 | 3/2004 | Kurian et al. | |
| 2009/0062436 A1 | 3/2009 | Breiner | |

OTHER PUBLICATIONS

Van Krevelen D.W., Some basic aspects of flame resistance of polymeric materials, Journal of Polymer, Elsevier Science, 1975, vol. 16, pp. 615-620.

International Search Report and Written Opinion in commonly owned International Application No. PCT/KR2006/005849, dated Aug. 22, 2007.

Notice of Allowance in commonly owned U.S. Appl. No. 12/430,369 mailed on Apr. 29, 2010, pp. 1-6.

* cited by examiner

*Primary Examiner* — Peter Szekely
(74) *Attorney, Agent, or Firm* — Summa, Additon & Ashe, P.A.

(57) ABSTRACT

The thermoplastic resin composition of the present invention comprises: about 100 parts by weight of a base resin comprising (A) about 5 to about 40% by weight of a rubber modified aromatic vinyl based copolymer resin, (B) about 30 to about 90% by weight of a polycarbonate resin, and (C) about 1 to about 50% by weight of a noncrystalline polyester resin; and (D) about 5 to about 30 parts by weight of an aromatic phosphate ester based compound.

24 Claims, No Drawings

FLAMEPROOF THERMOPLASTIC RESIN COMPOSITION

CROSS REFERENCE TO RELATED APPLICATION

This application claims priority from Korean Patent Application No. 2008-135170, filed Dec. 29, 2008, in the Korean Intellectual Property Office, the disclosure of which is incorporated herein by reference in its entirety.

FIELD OF THE INVENTION

The present invention relates to thermoplastic resin compositions that can have excellent flowability, flame resistance, impact strength, heat resistance, and chemical resistance.

BACKGROUND OF THE INVENTION

Generally, rubber modified styrene based copolymer resins have good moldability, excellent impact resistance and good appearance, and accordingly are widely used in the manufacture of electric and electronic goods, including heat radiating equipment.

A widely used method for imparting flame resistance to a rubber modified styrene based copolymer resin adds a halogen compound and antimony compound to the resin. However, in view of the problems associated with halogen based flame retardants, there has been a growing interest in non-halogen flame resistant rubber modified styrene based copolymer resin compositions.

Alternatives to halogen based flame retardants usually contain phosphorous, silicon, boron, nitrogen, and the like. The flame resistant efficiency of styrene based copolymer resins, however, is typically relatively poor with only these non-halogen compounds.

SUMMARY OF THE INVENTION

The present invention provides a thermoplastic resin composition that can have excellent flame resistance. The present invention also provides also a non-halogen containing thermoplastic resin composition that can be environmentally sound. The present invention further provides a thermoplastic resin composition that can have excellent impact strength, chemical resistance, heat resistance, and flowability as well as above mentioned properties.

The thermoplastic resin composition of the present invention comprises:

about 100 parts by weight of a base resin comprising (A) about 5 to about 40% by weight of a rubber modified aromatic vinyl based copolymer resin, (B) about 30 to about 90% by weight of a polycarbonate resin, and (C) about 1 to about 50% by weight of a noncrystalline polyester resin; and (D) about 5 to about 30 parts by weight of an aromatic phosphate ester based compound.

The noncrystalline polyester resin (C) can be a polyethylene terephthalate based copolymer including an acid component and a diol component, and which comprises about 0.1 to about 99 mole % of a cycloaliphatic diol derivative such as 1,4-cyclohexane dimethanol, per total acid component.

The present invention can provide an environmentally sound flame proof thermoplastic resin composition which can be economical and can have excellent chemical resistance, heat resistance, and flowability. The composition of the invention can achieve these properties by using a noncrystalline polyester resin as a char source and as an agent for imparting chemical resistance and flowability. The noncrystalline polyester resin can also help improve the flame retarding action of a phosphate ester by forming a char.

DETAILED DESCRIPTION OF THE INVENTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

Rubber modified styrenic copolymer resins have a low Limiting Oxygen Index due to the lack of char formation when burned or when thermogravimetric analysis (TGA) is performed. Halogen based flame retardants which are capable of creating a gas-phase flame retarding action can impart flame resistant properties to many kinds of resins. However other compounds may also be needed to provide a solid-phase flame retarding action. Accordingly it can be difficult to impart flame resistant property to rubber modified styrenic copolymer resin which does not char with only a phosphorous or nitrogen based flame retardant.

The present inventors have determined that adding a noncrystalline polyester resin (C), such as amorphous polyethylene terephthalate resin, to a rubber modified aromatic vinyl based copolymer resin (A) and a polycarbonate resin (B) as a char source can provide flame resistant properties, and can also improve flowability. The amorphous polyethylene terephthalate resin (C) can be useful because the main chain of the amorphous polyethylene terephthalate resin has a chemical structure including an aromatic group and an oxygen atom, which is a char forming structure, and because the amorphous polyethylene terephthalate resin can increase flowability. In addition, organic solvent or paint induced chemical corrosion of the rubber modified aromatic vinyl based copolymer resin (A) and polycarbonate resin (B) can be reduced or prevented by adding an amorphous polyethylene terephthalate resin having chemical resistance.

As a result of adding various kinds of polyester to a polycarbonate resin and a rubber modified styrenic copolymer resin, the present inventors have found that flowability can be increased about 40% or more and that similar impact strength and flame resistant properties can be achieved at the same time as compared to a resin prepared by blending polycarbonate resin and rubber modified styrenic copolymer resin.

The thermoplastic resin composition of the present invention comprises: a base resin comprising (A) a rubber modified aromatic vinyl based copolymer resin, (B) a polycarbonate resin, and (C) a noncrystalline polyester resin; and (D) an aromatic phosphate ester based compound.

In exemplary embodiments, the thermoplastic resin composition of the present invention comprises: about 100 parts by weight of a base resin comprising (A) about 5 to about 40% by weight of a rubber modified aromatic vinyl based copolymer resin, (B) about 30 to about 90% by weight of a polycarbonate resin, and (C) about 1 to about 50% by weight of a noncrystalline polyester resin; and (D) about 5 to about 30 parts by weight of an aromatic phosphate ester based compound.

(A) Rubber Modified Aromatic Vinyl Based Copolymer Resin

The rubber modified aromatic vinyl based copolymer resin according to the present invention is a polymer resin wherein a rubbery polymer is dispersed in the form of particles in a matrix of an aromatic vinyl polymer. The rubber modified aromatic vinyl based copolymer resin can be prepared by polymerizing rubbery polymer, aromatic vinyl monomer, and optionally monomer polymerizable with the aromatic vinyl monomer. The rubber modified aromatic vinyl based copolymer resins can be prepared by known methods such as emulsion polymerization, solution polymerization, suspension polymerization, and bulk polymerization.

In an embodiment of the present invention, the rubber modified aromatic vinyl based copolymer resin (A) comprises about 20 to about 50% by weight of rubbery polymer, about 40 to about 60% by weight of aromatic vinyl monomer, and about 10 to about 30% of cyanide vinyl monomer.

The rubber modified aromatic vinyl based copolymer resin can be produced by preparing separately a graft copolymer resin (A1) typically having a high rubber content and an aromatic vinyl copolymer resin (A2) which does not contain rubber and mixing them together. In bulk polymerization, the rubber modified aromatic vinyl based copolymer resin can be prepared in one process without separately preparing the graft copolymer resin (A1) and the aromatic vinyl copolymer resin (A2). In either case, the rubber content in a final rubber modified aromatic vinyl based copolymer resin can range from about 1 to about 30% by weight. The Z-average particle size of the rubber in the rubber modified aromatic vinyl based copolymer resin can range from about 0.1 to 6.0 μm, for example about 0.25 to about 3.5 μm.

In the rubber modified aromatic vinyl based copolymer resin, the graft copolymer resin (A1) can be used alone or in combination with a copolymer resin (A2) which does not contain rubber, depending on the compatibility thereof.

(A1) Graft Copolymer Resin

The graft copolymer resin (A1) useful in the present invention may be prepared by adding an aromatic vinyl monomer, a monomer copolymerizable with the aromatic vinyl monomer, and optionally a monomer providing processability and heat resistance to a rubbery polymer and polymerizing them together.

In exemplary embodiments, the graft copolymer resin (A1) may comprise about 10 to about 60% by weight of a rubbery polymer, about 20 to about 80% by weight of an aromatic vinyl monomer, and about 5 to about 45% of by weight a monomer copolymerizable with the aromatic vinyl monomer.

Examples of the rubbery polymer suitable for preparing the graft copolymer resin may include without limitation diene rubbers such as butadiene rubber, styrene-butadiene copolymer, acrylonitrile-butadiene copolymer, and the like; saturated rubbers in which hydrogen is added to a diene rubber; isoprene rubbers; chloroprene rubber; acryl rubbers such as butyl acrylate and the like; and ethylene/propylene/diene terpolymers (EPDM), and the like, and combinations thereof. The content of the rubber in the graft copolymer resin (A1) may be about 5 to about 65% by weight. The average size of rubber particles may be in the range of from about 0.1 to about 4 μm, and can be readily determined by the skilled artisan depending on the desired impact strength and surface appearance.

Examples of the aromatic vinyl monomer that can be graftcopolymerized onto the rubber may include without limitation styrene, α-methylstyrene, β-methylstyrene, ρ-methylstyrene, ρ-t-methylstyrene, ethyl styrene, vinyl xylene, monochlorostyrene, dichlorostyrene, dibromostyrene, vinyl naphthalene, other nuclear substituted styrene, and the like. These can be used singly or as a combination of at least two or more thereof. The graft copolymer resin (A1) may include the aromatic vinyl monomer in an amount of about 34 to about 94% by weight.

Examples of the monomer copolymerizable with the aromatic vinyl monomer may include without limitation vinyl cyanide such as acrylonitrile, unsaturated nitrile compounds such as ethacrylonitrile and methacrylonitrile, and the like. These can be used singly or as a combination of at least two or more thereof. In one exemplary embodiment, the graft copolymer resin (A1) may include the copolymerizable monomer in an amount of about 1 to about 30% by weight.

Examples of the monomer providing processability and heat resistance may include without limitation acrylic acid, methacrylic acid, maleic acid anhydride, N-substituted maleimide and the like, and combinations thereof. The graft copolymer resin (A1) may include the monomer providing processability and heat resistance in an amount of about 1 to about 30% by weight.

(A2) Aromatic Vinyl Copolymer Resin

The aromatic vinyl copolymer resin (A2) of the present invention may be prepared by copolymerizing the same components as the graft copolymer resin (A1) except the rubber component. For example, the aromatic vinyl copolymer resin (A2) may be prepared by copolymerizing an aromatic vinyl monomer, a monomer copolymerizable with the aromatic vinyl monomer, and optionally a monomer providing processability and heat resistance.

Examples of the aromatic vinyl monomer may include without limitation styrene, α-methylstyrene, β-methylstyrene, ρ-methylstyrene, ρ-t-methylstyrene, ethyl styrene, vinyl xylene, monochlorostyrene, dichlorostyrene, dibromostyrene, vinyl naphthalene, and the like. These can be used singly or as a combination of at least two or more thereof. The aromatic vinyl copolymer resin (A2) may include the aromatic vinyl monomer in an amount of about 60 to about 90% by weight.

Examples of the monomer copolymerizable with the aromatic vinyl monomer may include without limitation vinyl cyanide such as acrylonitrile, unsaturated nitrile compounds such as ethacrylonitrile and methacrylonitrile, and the like. These can be used singly or as a combination of at least two or more thereof. The aromatic vinyl copolymer resin (A2) may include the copolymerizable monomer in an amount of about 10 to about 40% by weight.

Examples of the monomer providing processability and heat resistance may include acrylic acid, methacrylic acid, maleic acid anhydride, N-substituted maleimide and the like, and combinations thereof. The aromatic vinyl copolymer resin (A2) may include the monomer providing processability and heat resistance in an amount of about 0 to about 30% by weight.

Examples of the rubber modified aromatic vinyl based copolymer resin may include without limitation acrylonitrilebutadiene-styrene copolymer resin (ABS), acrylonitrile-acryl rubber-styrene copolymer resin (AAS), acrylonitrile-ethylene propylene rubber-styrene copolymer resin (AES), and the like, and combinations thereof.

In exemplary embodiments of the invention, the rubber modified aromatic vinyl based copolymer resin comprises about 10 to about 100% by weight of a graft copolymer resin (A1) and about 0 to about 90% by weight of an aromatic vinyl copolymer resin (A2). For example, the rubber modified aromatic vinyl copolymer resin can comprise about 55 to about 90% by weight of a graft copolymer resin (A1) and about 10 to about 45% by weight of an aromatic vinyl copolymer resin (A2). In another embodiment of the invention, the rubber modified aromatic vinyl copolymer resin comprises about 15 to about 50% by weight of a graft copolymer resin (A1) and about 50 to about 85% by weight of an aromatic vinyl copolymer resin (A2).

In the present invention, the thermoplastic resin composition can include the rubber modified styrenic copolymer resin (A) in amount of about 5 to about 40% by weight, based on the total weight of a base resin comprising (A), (B), and (C). If the rubber modified styrenic copolymer resin (A) is used in an amount less than about 5% by weight, the thermoplastic resin composition may not have desired good moldability, impact strength, and/or appearance. If the rubber modified styrenic copolymer resin (A) is used in an amount more than about 40% by weight, phase separation with the polycarbonate resin may occur.

(B) Polycarbonate Resin

The polycarbonate resin (B) of the present invention may be prepared by reacting one or more diphenols represented by the following Chemical Formula 1 with phosgene, halogen formate, or carbonic acid diester:

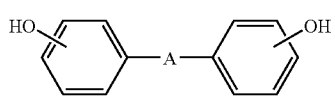

[Chemical Formula 1]

wherein A is a single-bond, C1-C5 alkylene, C1-C5 alkylidene, C5-C6 cycloalkylidene, S, or $SO_2$.

Examples of the diphenols represented by the foregoing Chemical Formula 1 may comprise without limitation 4,4'-dihydroxydiphenyl, 2,2-bis-(4-hydroxyphenyl)-propane, 2,4-bis-(4-hydroxyphenyl)-2-methylbutane, 1,1-bis-(4-hydroxyphenyl)-cyclohexane, 2,2-bis-(3-chloro-4-hydroxyphenyl)-propane, 2,2-bis-(3,5-dichloro-4-hydroxyphenyl)-propane, and the like and combinations thereof. In addition, hydroquinone, resorcinol or the like may be used as a dilphenol compound. In exemplary embodiments, the diphenol may be 2,2-bis-(4-hydroxyphenyl)-propane, 2,2-bis-(3,5-dichloro-4-hydroxyphenyl)-propane, or 1,1-bis-(4-hydroxyphenyl)-cyclohexane. In another exemplary embodiment, the diphenol may be 2,2-bis-(4-hydroxyphenyl)-propane (also referred to as bisphenol-A).

Examples of the polycarbonate resin may comprise polycarbonate resins having a weight-average molecular weight (Mw) of about 10,000 to about 200,000 g/mol, for example about 15,000 to about 80,000 g/mol.

The polycarbonate resin of the present invention may comprise branched polycarbonate resins, which can be prepared by adding about 0.05 to about 2 mole % of tri or more multi functional compound, for example a compound having 3 or more phenol groups, based on the total amount of diphenols used in the polymerization.

In the present invention, the thermoplastic resin composition can include the polycarbonate resin (B) in amount of about 30 to about 90% by weight, based on the total weight of a base resin comprising (A), (B), and (C). If the polycarbonate resin is used in an amount less than about 30% by weight, flame retardancy and mechanical properties may be reduced.

(C) Noncrystalline Polyester Resin

The base resin of the present invention further comprises a noncrystalline (also amorphous) polyester resin to improve flowability and chemical resistance, which are basic properties of the resin.

In an exemplary embodiment, the flame proof thermoplastic resin composition of the present invention can have a melt flow index of about 45 to about 80 g/10 min measured according to ASTM D-1238 (10 Kg load at 220° C.). In this case, the flame proof thermoplastic resin composition of the present invention can have good flowability as well as excellent chemical resistance so that it can be readily used in various applications.

The noncrystalline polyester may be prepared by polymerizing an acid component and a diol component, wherein the diol component includes at least one cycloaliphatic diol component.

Exemplary acid components can include without limitation terephthalic acid, isophthalic acid, 1,2-naphthalene dicarboxylic acid, 1,4-naphthalene dicarboxylic acid, 1,5-naphthalene dicarboxylic acid, 1,6-naphthalene dicarboxylic acid, 1,7-naphthalene dicarboxylic acid, 1,8-naphthalene dicarboxylic acid, 2,3-naphthalene dicarboxylic acid, 2,6-naphthalene dicarboxylic acid, 2,7-naphthalene dicarboxylic acid, aromatic dicarboxylate in which acid is substituted with a dimethyl group such as dimethyl terephthalate (DMT) and dimethyl isophthalate, alkyl ester of naphthalene dicarboxylate, dimethyl-1,2-naphthalate, dimethyl-1,5-naphthalate, dimethyl-1,7-naphthalate, dimethyl-1,7-naphthalate, dimethyl-1,8-naphthalate, dimethyl-2,3-naphthalate, dimethyl-2,6-naphthalate, dimethyl-2,7-naphthalate, and the like and combinations thereof.

Exemplary diol components can include without limitation C2 to C12 diols such as but not limited to ethylene glycol, 1,2-propylene glycol, 1,3-propylene glycol, 2,2-dimethyl-1,3-propanediol, 2,2-dimethyl-1,3-propylene glycol, 1,3-butanediol, 1,4-butanediol, 1,5-pentanediol, 1,6-hexanediol, 1,3-cyclohexane dimethanol, 1,4-cyclohexane dimethanol, and the like and combinations thereof.

In exemplary embodiments of the invention, the noncrystalline polyester comprises 1,4-cyclohexane dimethanol as a diol component, and other diol components can be used therewith.

Exemplary noncrystalline polyester resins include without limitation polyalkylene terephthalate based resins, polyalkylene naphthalate based resins, and combinations thereof. Regardless of the acid and diol components used in the noncrystalline polyester resin, the noncrystalline polyester resins of the present invention may comprise about 0.1 to about 0.9 mole % of a cycloaliphatic diol component, for example about 20 to about 60 mole %, per total acid component. In one exemplary embodiment, the cycloaliphatic diol component may be 1,4-cyclohexane dimethanol.

The noncrystalline polyester resins of the present invention may comprise glycol-modified polyalkylene terephthalate such as polyethylene-1,4-cyclohexane dimethylene terephthalate (PETG), polycyclohexane terephthalate (PCT), and the like, and combinations thereof. In one exemplary embodiment, the noncrystalline polyester resin may be PETG, singly or in combination with one or more other noncrystalline polyester resin(s). One or more crystalline polyester resins, such as polyethylene terephthalate (PET), polybutylene terephthalate (PBT), polyethylene naphthalate, and the like, and combinations thereof, can also be used if flowability is not negatively impacted for a particular application.

The intrinsic viscosity of the noncrystalline polyester resins of the present invention can be about 0.5 to about 1.0, for example about 0.6 to about 0.8 dl/g.

Generally, a noncrystalline polyester resin refers to a terpolymer polyester comprising an acid or ester thereof, a diol, and a cycloaliphatic diol monomer, and a crystalline polyester resin refers to a polymer comprising the above mentioned composition except the cycloaliphatic diol monomer. For example, a noncrystalline polyethylene terephthalate resin refers to a terpolymer polyester comprising terephthalic acid, an ethylene diol, and a cycloaliphatic diol monomer, and crystalline polyester resin refers to a polymer comprising the above mentioned composition except the cycloaliphatic diol monomer.

The thermoplastic resin composition of the present invention can include the noncrystalline polyester resin in an amount of about 1 to about 50% by weight, based on the total weight of a base resin comprising (A), (B), and (C).

(D) Aromatic Phosphate Ester Based Compound

The aromatic phosphate ester compound is represented by compounds of the following Formula 2, and combinations thereof, but is not limited thereto.

[Chemical Formula 2]

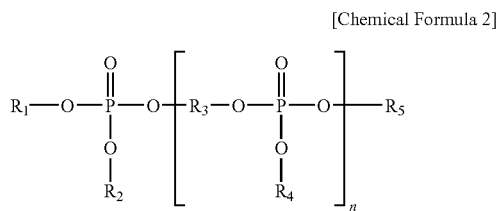

wherein each of R1, R2, R4, and R5 independently comprises C6-C20 aryl or C1-C10 alkyl-substituted C6-C20 aryl, R3 is a derivative of a dialcohol comprising resorcinol, hydroquinol, bisphenol-A, bisphenol-S, or a combination thereof, and n is an integer from 0 to 5.

i) When n is 0, the compound represented in the Formula 2 includes triphenylphosphate; tricresylphosphate, cresyldiphenylphosphate, trixylenylphosphate, tri(2,4,6-trimethylphenyl)phosphate, tri(2,4-ditertiarybutylphenyl)phosphate, tri(2,6-ditertiarybutylphenyl)phosphate, and the like, and combinations thereof.

ii) When n is 1, the compound represented in the Formula 2 includes resorcinol bis(diphenylphosphate), hydroquinol bis(diphenylphosphate), bisphenolA-bis(diphenylphosphate), resorcinol bis(2,6-ditertiarybutylphenylphosphate), hydroquinol bis(2,6-dimethylphenylphosphate), and the like, and combinations thereof.

iii) When n is 2 or more, the compound represented in the Formula 2 may exist in the form of a mixture of oligomer types, and may be a compound selected from above mentioned compounds, or a combination thereof.

The aromatic phosphate ester compound can be replaced partially or totally by other conventional phosphorous-containing flame retardants such as red phosphorous, phosphonates, phosphinates, phosphazenes, and the like and combinations thereof.

The aromatic phosphate ester compound may be used as a flame retardant in the resin composition of the present invention, and may be used in amount of about 5 to about 30 parts by weight, for example about 10 to about 20 parts by weight, per about 100 parts by weight of the base resin. If the amount of the aromatic phosphate ester compound is less than about 5 parts by weight, the resin composition may not have sufficient flame retardancy. If the amount of the aromatic phosphate ester compound is more than 30 parts by weight, the heat resistance and mechanical strength of the resin composition may be deteriorated.

The thermoplastic resin composition may further include one or more other components such as but not limited to anti-dripping agents, impact modifiers, antioxidants, plasticizers, heat stabilizers, light stabilizers, compatibilizers, pigments, dyes, inorganic fillers, antibacterial agent, antistatic agent and the like and combinations thereof depending on the desired properties to be imparted to the final thermoplastic resin composition. The additional components can be used in conventional amounts, for example, about 0 to about 50 parts by weight, based on about 100 parts by weight of the thermoplastic resin composition. For example, exemplary inorganic filler may include without limitation glass fiber, silica, talc, ceramic, and the like and combinations thereof, and may be employed in amount of about 0 to about 50 parts by weight, per about 100 parts by weight of the base resin.

The resin composition according to the present invention can be used for the manufacture of various articles, including without limitation electric or electronic goods such as TV housings, office automation equipments, and the like. Products including the thermoplastic resin composition of the invention can be produced using conventional polymer processing techniques such as but not limited to extrusion molding, injection molding, blow molding and the like and the skilled artisan will appreciate how to produce such products without undue experimentation.

The invention may be better understood by reference to the following examples which are intended for the purpose of illustration and are not to be construed as in any way limiting the scope of the present invention, which is defined in the claims appended hereto.

EXAMPLES

The base resin, the flame retardant, and the additives which are used in Examples and Comparative Examples are prepared as follows.

(A) Rubber Modified Aromatic Vinyl Based Copolymer Resin

The rubber modified aromatic vinyl based copolymer resin (A) of the Examples and Comparative Examples of the present invention is a styrenic graft copolymer resin.

50 parts of butadiene rubber latex (solid content), 36 parts of styrene, 14 parts of acrylonitrile, and 150 parts of deionized water are mixed. To the mixture, 1.0 part of potassium oleate, 0.4 parts of cumen hydroperoxide, 0.2 parts of mercaptan-containing chain transfer agent, 0.4 parts of glucose, 0.01 parts of ferrous sulfate hydrate, and 0.3 parts of sodium pyrophosphate are added. The blend is kept at 75° C. for 5 hours to obtain g-ABS latex. To the g-ABS latex, 0.4 parts of sulfuric acid is added, coagulated and dried to obtain graft ABS copolymer resin (g-ABS) in powder form.

(B) Polycarbonate Resin

Panlite L-1225 Grade of Teijin Ltd. of Japan is used as a polycarbonate resin.

(C) Noncrystalline Polyester Resin

SKYGREEN PETG (S2008) Grade of SKC Ltd. of Korea is used as a noncrystalline polyester resin (C1) in the Examples of the invention, and A1100 of Anychem Ltd. is used as a crystalline polyester resin (C2) in the Comparative Examples.

(D) Aromatic Phosphate Ester Based Compound

A bisphenol A bis(diphenyl phosphate), commercial name CR-741 Grade from Daihachi Chemical Ltd. of Japan is used as an aromatic phosphate ester based compound in the Examples and Comparative Examples.

The above compounds (A) to (D) are mixed in amounts as set forth in Table 1 and extruded through a conventional two axes extruding machine at a temperature of about 220 to about 250° C. to form pellets.

The pellets are dried at 80° C. for 3 hours and injected through a 80 oz injection machine at about 23° C. molding temperature and at about 250° C. mold temperature to form a sample with ⅛" thickness for an impact strength test, a sample with 32 mm thickness for a face impact strength test, and a sample for a flame resistance test. The sample for the flame resistance test is tested according to UL94. Izod impact strength is tested according to ASTM D-256 (notch).

Melt flow index is measured under a 10 Kg weight loading at 220° C. according to ASTM D-1238, and injection molding length through a spiral mold is measured at 250° C. cylinder temperature and 60° C. mold temperature using a 80 oz injection machine.

Face impact strength is tested by dropping a 5 Kg weight onto the sample from a height of 0.95M and observing whether the sample breaks or not.

Chemical resistance against organic solvent is tested by setting a 1/16" thick sample in a jig bent with a constant curvature, applying organic solvent to the sample under 0.6% strain, and observing the extent of cracking using the naked eye.

Heat resistance is tested under the condition of 5 kgf and 50° C./hr temperature increment according to ISO R306. Vicat softening temperature (° C.) is measured under the condition of 5 kg weight and 50° C./hr according to ASTM D-1525 (Load Cell: 5 Kg). In addition, the Vicat softening temperature (VST) of the sample is measured using a S6-E machine from Toyoseiky Ltd. according to ASTM D1525.

Although the amount of polycarbonate decreases, V0 flame resistance can be maintained. IZOD impact strength decreases when polyester resin is used in amount of 15 to 20 parts by weight based on 100 parts by weight of the base resin, however, face impact strength which is regarded as a practical impact strength is maintained.

Thus, the present invention can provide a flame proof thermoplastic resin having excellent flowability, chemical resistance, and practical impact strength by including (A) a rubber modified aromatic vinyl based copolymer resin, (B) a polycarbonate resin, and (C1) an noncrystalline polyester resin; and (D) an aromatic phosphate ester based compound.

Many modifications and other embodiments of the invention will come to mind to one skilled in the art to which this invention pertains having the benefit of the teachings presented in the foregoing description. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

TABLE 1

| | Examples | | | | Comparative Examples | | | | |
|---|---|---|---|---|---|---|---|---|---|
| | 1 | 2 | 3 | 4 | 1 | 2 | 3 | 4 | 5 |
| Rubber modifided styrenic copolymer (A) | 10 | 10 | 10 | 10 | 10 | 10 | 10 | 10 | 10 |
| Polycarbonate (B) | 85 | 80 | 75 | 70 | 90 | 75 | 70 | 90 | 90 |
| Noncrystalline polyester resin (C1) | 5 | 10 | 15 | 20 | — | — | — | — | — |
| Crystalline polyester resin (C2) | — | — | — | — | — | 15 | 20 | — | — |
| Aromatic phosphate ester based compound (D) CR-741 | 15 | 15 | 15 | 15 | 15 | 15 | 15 | 25 | 35 |
| 1/8" Izod impact strength (kgf · cm/cm) | 65 | 59 | 15 | 14 | 75 | 13 | 9 | 20 | 11 |
| 3.2 mm Face impact strength (46.55 J) | Non Break | Non Break | Non Break | Non Break | Non Break | Non Break | Non Break | Non Break | Non Break |
| Flame resistance (UL 94, 2.0 mm thickness) | V0 | V0 | V0 | V0 | V0 | V0 | V0 | V0 | V0 |
| Melt flow index (g/10 min) | 45 | 52 | 55 | 62 | 35 | 40 | 42 | 48 | 63 |
| Injection molding length (Spiral) (cm) | 35.0 | 43.5 | 48.0 | 54.0 | 30.5 | 33.0 | 34.0 | 45.0 | 53.0 |
| Chemical resistance** detergent (alkali) | D | B | B | A | D | B | A | D | D |
| Industrial oil | D | C | C | B | D | C | B | D | D |
| edible oil | B | A | A | A | B | A | A | D | D |
| Heat resistance VST (5 kg) (° C.) | 98 | 96 | 94 | 90 | 103 | 93 | 91 | 87 | 80 |

**Chemical resistance test using naked eyes:
A: No crack at all,
B: Slim crack is seen,
C: Thick crack is seen,
D: piece is broken off As illustrated in Tables 1, Examples 1 to 4 show that melt flow index, injection molding length, and chemical resistance increase with increasing amounts of the noncrystalline polyester. However Comparative Examples 2 to 3 comprising crystalline polyester resin show that chemical resistance increases but flowability is not significantly improved. In addition Comparative Examples 4 to 5 which do not include crystalline polyester resin show that heat resistance is poor.

What is claimed is:

1. A flame proof thermoplastic resin composition, comprising:
about 100 parts by weight of a base resin comprising (A) about 5 to about 40% by weight of a rubber modified aromatic vinyl based copolymer resin, (B) about 30 to about 90% by weight of a polycarbonate resin, and (C) about 1 to about 50% by weight of a noncrystalline polyester resin, wherein said noncrystalline polyester resin (C) further comprises a crystalline polyester resin; and (D) about 5 to about 30 parts by weight of an aromatic phosphate ester based compound.

2. The flame proof thermoplastic resin composition of claim 1, wherein said rubber modified aromatic vinyl based copolymer resin comprises about 10 to about 60% by weight of a rubbery polymer, about 20 to about 80% by weight of an aromatic vinyl monomer, and about 5 to about 45% of by weight a monomer copolymerizable with the aromatic vinyl monomer.

3. The flame proof thermoplastic resin composition of claim 2, wherein said rubbery polymer comprises diene rubber, saturated rubber in which hydrogen is added to a diene rubber, isoprene rubber, chloroprene rubber, acrylic rubber, ethylene/propylene/diene terpolymer (EPDM), or a combination thereof.

4. The flame proof thermoplastic resin composition of claim 2, wherein said aromatic vinyl monomer comprises styrene, α-methylstyrene, nuclear substituted styrene, or a combination thereof.

5. The flame proof thermoplastic resin composition of claim 2, wherein said monomer copolymerizable with the aromatic vinyl monomer comprises acrylonitrile, methyl methacrylonitrile, methyl methacrylate, maleic acid anhydride, N-substituted maleimide, or a combination thereof.

6. The flame proof thermoplastic resin composition of claim 1, wherein said noncrystalline polyester resin (C) comprises about 0.1 to about 99 mole % of a cycloaliphatic diol component, per total acid component.

7. The flame proof thermoplastic resin composition of claim 6, wherein said cycloaliphatic diol component is 1,4-cyclohexane dimethanol.

8. The flame proof thermoplastic resin composition of claim 6, wherein said noncrystalline polyester resin (C) has an intrinsic viscosity of about 0.5 to about 1.0 dl/g.

9. The flame proof thermoplastic resin composition of claim 1, wherein said aromatic phosphate ester based compound (D) is represented as following Formula 2:

[Chemical Formula 2]

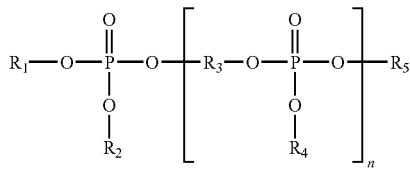

wherein each of R1, R2, R4, and R5 independently comprises C6-C20 aryl or C1-C10 alkyl substituted C6-C20 aryl, R3 is a derivative of a dialcohol comprising resorcinol, hydroquinol, bisphenol-A, bisphenol-S, or a combination thereof, and n is an integer from 0 to 5.

10. The flame proof thermoplastic resin composition of claim 1, further comprising at least one additive selected from the group consisting of anti-dripping agents, impact modifiers, antioxidants, plasticizers, heat stabilizers, light stabilizers, compatibilizers, pigments, dyes, inorganic fillers, antibacterial agent, antistatic agent, and combinations thereof.

11. The flame proof thermoplastic resin composition of claim 1, having a melt flow index of about 45 to about 80 g/10 min measured according to ASTM D-1238 (10 Kg load at 220° C.).

12. A molded article produced from the flame proof thermoplastic resin composition as defined in claim 1.

13. A flame proof thermoplastic resin composition, comprising:
about 100 parts by weight of a base resin comprising (A) about 5 to about 40% by weight of a rubber modified aromatic vinyl based copolymer resin, (B) about 30 to about 90% by weight of a polycarbonate resin, and (C) about 1 to about 50% by weight of a noncrystalline polyester resin; and (D) about 5 to about 30 parts by weight of an aromatic phosphate ester based compound, wherein said aromatic phosphate ester based compound (D) is represented as following Formula 2:

[Chemical Formula 2]

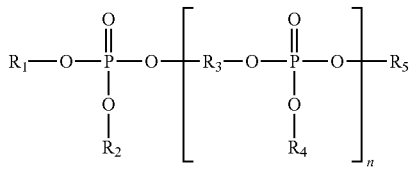

wherein each of R1, R2, R4, and R5 independently comprises C6-C20 aryl or C1-C10 alkyl substituted C6-C20 aryl, R3 is a derivative of a dialcohol comprising resorcinol, bisphenol-A, bisphenol-S, or a combination thereof, and n is an integer from 0 to 5.

14. The flame proof thermoplastic resin composition of claim 13, wherein said rubber modified aromatic vinyl based copolymer resin comprises about 10 to about 60% by weight of a rubbery polymer, about 20 to about 80% by weight of an aromatic vinyl monomer, and about 5 to about 45% of by weight a monomer copolymerizable with the aromatic vinyl monomer.

15. The flame proof thermoplastic resin composition of claim 14, wherein said rubbery polymer comprises diene rubber, saturated rubber in which hydrogen is added to a diene rubber, isoprene rubber, chloroprene rubber, acrylic rubber, ethylene/propylene/diene terpolymer (EPDM), or a combination thereof.

16. The flame proof thermoplastic resin composition of claim 14, wherein said aromatic vinyl monomer comprises styrene, α-methylstyrene, nuclear substituted styrene, or a combination thereof.

17. The flame proof thermoplastic resin composition of claim 14, wherein said monomer copolymerizable with the aromatic vinyl monomer comprises acrylonitrile, methyl methacrylonitrile, methyl methacrylate, maleic acid anhydride, N-substituted maleimide, or a combination thereof.

18. The flame proof thermoplastic resin composition of claim 13, wherein said noncrystalline polyester resin (C) comprises about 0.1 to about 99 mole % of a cycloaliphatic diol component, per total acid component.

19. The flame proof thermoplastic resin composition of claim 18, wherein said cycloaliphatic diol component is 1,4-cyclohexane dimethanol.

20. The flame proof thermoplastic resin composition of claim 18, wherein said noncrystalline polyester resin (C) further comprises a crystalline polyester resin.

21. The flame proof thermoplastic resin composition of claim 18, wherein said noncrystalline polyester resin (C) has an intrinsic viscosity of about 0.5 to about 1.0 dl/g.

22. The flame proof thermoplastic resin composition of claim 13, further comprising at least one additive selected from the group consisting of anti-dripping agents, impact modifiers, antioxidants, plasticizers, heat stabilizers, light stabilizers, compatibilizers, pigments, dyes, inorganic fillers, antibacterial agent, antistatic agent, and combinations thereof.

23. The flame proof thermoplastic resin composition of claim 13, having a melt flow index of about 45 to about 80 g/10 min measured according to ASTM D-1238 (10 Kg load at 220° C.).

24. A molded article produced from the flame proof thermoplastic resin composition as defined in claim 13.

* * * * *